(12) United States Patent
Kamikawa et al.

(10) Patent No.: US 8,210,752 B2
(45) Date of Patent: Jul. 3, 2012

(54) WHEEL SUPPORTING DEVICE

(75) Inventors: Tsuyoshi Kamikawa, Nara (JP); Shinichirou Kashiwagi, Yao (JP)

(73) Assignee: Jtekt Corporation, Osaka-Shi, Osaka (JP)

( * ) Notice: Subject to any disclaimer, the term of this patent is extended or adjusted under 35 U.S.C. 154(b) by 700 days.

(21) Appl. No.: 12/232,906

(22) Filed: Sep. 25, 2008

(65) Prior Publication Data

US 2009/0097792 A1 Apr. 16, 2009

(30) Foreign Application Priority Data

Sep. 26, 2007 (JP) ................ P2007-249131
Sep. 26, 2007 (JP) ................ P2007-249133
Sep. 26, 2007 (JP) ................ P2007-249137

(51) Int. Cl.
*F16C 13/00* (2006.01)
(52) U.S. Cl. ....................................... 384/544
(58) Field of Classification Search .................. 384/544, 384/589; 464/170, 178
See application file for complete search history.

(56) References Cited

U.S. PATENT DOCUMENTS

| | | | |
|---|---|---|---|
| 4,893,960 A | | 1/1990 | Beier et al. |
| 5,674,011 A | * | 10/1997 | Hofmann et al. ............. 384/448 |
| 6,135,571 A | | 10/2000 | Mizukoshi et al. |
| 6,146,022 A | | 11/2000 | Sahashi et al. |
| 6,676,298 B2 | * | 1/2004 | Schote .......................... 384/477 |
| 6,682,221 B2 | * | 1/2004 | Rutter et al. .................. 384/448 |
| 7,255,482 B2 | | 8/2007 | Yamamoto |
| 2002/0187843 A1 | | 12/2002 | Krude |
| 2004/0022471 A1 | | 2/2004 | Yamamoto |
| 2004/0037482 A1 | | 2/2004 | Ouchi |
| 2005/0159227 A1 | * | 7/2005 | Ouchi et al. ................. 464/178 |
| 2007/0219003 A1 | | 9/2007 | Tajima et al. |
| 2008/0156610 A1 | | 7/2008 | Langer et al. |
| 2008/0185906 A1 | | 8/2008 | Langer et al. |
| 2009/0096278 A1 | | 4/2009 | Cermak |

FOREIGN PATENT DOCUMENTS

| | | |
|---|---|---|
| DE | 10 2005 018 126 | 10/2006 |
| DE | 102005054283 A1 | 5/2007 |
| EP | 0 936 086 A2 | 8/1999 |
| EP | 2043880 A1 | 4/2009 |
| JP | 63-184501 | 7/1988 |
| JP | 11-240306 | 9/1999 |

(Continued)

OTHER PUBLICATIONS

European Search Report dated Jun. 9, 2011.

(Continued)

*Primary Examiner* — Thomas R Hannon
(74) *Attorney, Agent, or Firm* — McGinn IP Law Group, PLLC

(57) ABSTRACT

A rolling bearing is provided on an outer peripheral surface of a hub spindle of a hub wheel on which a wheel is mounted. Opposite side face splines, which, by meshing with each other, couple the hub spindle and an outer ring of a constant velocity joint torque-transmittably, are respectively formed on an end face of the hub spindle and on an end face of the outer ring of the constant velocity joint which is abutted against this end face. A tubular seal member for covering outer peripheries of the opposite side face splines is disposed so as to straddle an inner ring of the rolling bearing and the outer ring of the constant velocity joint, while maintaining a sealing state.

7 Claims, 11 Drawing Sheets

FOREIGN PATENT DOCUMENTS

| | | |
|---|---|---|
| JP | A-2003-130069 | 5/2003 |
| JP | 2003-172369 | 6/2003 |
| JP | A-2004-084763 | 3/2004 |
| JP | A-2004-345370 | 12/2004 |
| JP | A-2004-353724 | 12/2004 |
| JP | 2005-138653 | 6/2005 |
| JP | 2005-324736 | 11/2005 |
| JP | A-2005-308151 | 11/2005 |
| JP | A-2006-077829 | 3/2006 |
| JP | 2007-62647 | 3/2007 |
| JP | T-2009-543009 | 12/2009 |
| WO | WO 2006/111140 A1 | 10/2006 |
| WO | WO 2006/111146 A3 | 10/2006 |
| WO | WO 2008/006339 A1 | 1/2008 |

OTHER PUBLICATIONS

European Search Report dated Jul. 21, 2009.
European Search Report dated Sep. 4, 2009.
Notification of Reason for Refusal dated Dec. 7, 2011, with English translation.

* cited by examiner

WHEEL SUPPORTING DEVICE

BACKGROUND OF THE INVENTION

1. Field of the Invention

The present invention relates to a wheel supporting device in which a hub spindle of a hub wheel on which a wheel is mounted and an outer ring of a constant velocity joint are torque-transmittably coupled to each other.

2. Related Art

As a wheel supporting device of this type, a device is known in which a hub spindle of a hub wheel and an outer ring of a constant velocity joint are coupled by a coupling bolt, and opposite side face splines adapted to mesh with each other are respectively formed on an end face of the hub spindle of the hub wheel and on an end face of the constant velocity joint which is abutted against that end face. The hub wheel and the constant velocity joint are torque-transmittably coupled to each other by these opposite side face splines (e.g., refer to JP-A-63-184501).

As a wheel supporting device of this type, a device is known in which, as shown in FIG. 12, to torque-transmittably couple a hub wheel 210 and a constant velocity joint 250, opposite side face splines 218 and 262, which are adapted to mesh with each other to transmit torque between the hub wheel 210 and the constant velocity joint 250, are respectively formed on an end face of a hub spindle 213 of the hub wheel 210 and on an end face of a side wall portion 261 of an outer ring 260 of the constant velocity joint 250 which is abutted against that end face.

In addition, as a wheel supporting device of this type, a coupling bolt 270 is projected from the end face of the side wall portion 261 of the outer ring 260 of the constant velocity joint 250, and an externally threaded portion 273 of a leading end of a shank 272 of this coupling bolt 270 is inserted into an inner hole 214 of the hub spindle 213 from one end side thereof (central side in the transverse direction of the vehicle) toward the other end side thereof (outer side in the transverse direction of the vehicle). In a state in which this externally threaded portion 273 is projected from the other end side of the inner hole 214 of the hub spindle 213, a lock nut 275 is tightened against the externally threaded portion 273, thereby integrally coupling the hub wheel 210 and the constant velocity joint 250.

In the wheel supporting device having the structure such as the one shown in FIG. 12, owing to an annular gap between the inner hole 214 of the hub spindle 213 and the shank 272 of the coupling bolt 270, it is difficult to perform centering between the hub wheel 210 and the constant velocity joint 250, and the meshing between the opposite side face splines 218 and 262 is troublesome.

In addition, in the state in which the hub wheel 210 and the constant velocity joint 250 are integrally coupled by the coupling bolt 270 and the lock nut 275, it is conceivable that, owing to the annular gap between the inner hole 214 of the hub spindle 213 and the shank 272 of the coupling bolt 270, the hub wheel 210 and the constant velocity joint 250 can vibrate relative to each other, or abnormal noise can occur.

Accordingly, it is conceivable to fit the inner hole 214 of the hub spindle 213 and the shank 272 of the coupling bolt 270 with a slight gap by fabricating the inner hole 214 of the hub spindle 213 and the shank 272 of the coupling bolt 270 with high accuracy. However, if the inner hole 214 of the hub spindle 213 and the shank 272 of the coupling bolt 270 are fabricated with high accuracy, the fabrication cost becomes high, and the insertability of the shank 272 of the coupling bolt 270 with respect to the inner hole 214 of the hub spindle 213 deteriorates.

Further, as shown in FIG. 12, an inner ring 221 of a rolling bearing 220 is insertedly fitted on an outer peripheral surface of the hub spindle 213 of the hub wheel 210, a tubular spindle-shaped spindle end portion of the hub spindle 213 is calked toward an end face (radially outward) of the inner ring 221 to form a calked portion 217, thereby fixing the inner ring 221 to the outer peripheral surface of the hub spindle 213.

It is a difficult operation to form the side face splines 218 on the end face of the calked portion 217 by forging while ensuring concentricity after the inner ring 221 of the rolling bearing 220 has been assembled onto the outer peripheral surface of the hub spindle 213 of the hub wheel 210 by means of the calked portion 217.

Further, when the side face splines 218 are formed by forging, an axial compressive force acts on the inner ring 221, thereby possibly exerting an adverse effect on a raceway surface 222 of the inner ring 221.

Furthermore, also in the inspection of quality assurance of the side face splines 226 formed on the calked portion 217 of the hub spindle 213, the inspection has been troublesome since it has to be performed in a state in which the rolling bearing 220 including the inner ring 221 is assembled on the hub spindle 213.

Moreover, if the hub wheel and the constant velocity joint are torque-transmittably coupled to each other by the meshing of the opposite side face splines on the end face of the hub spindle of the hub wheel and on the end face of the constant velocity joint, there is a possibility of ingress of foreign matters such as muddy water and dust into the interior from a gap between meshing portions of these opposite side face splines, resulting in the development of rust.

SUMMARY OF THE INVENTION

In view of the above-described problems, an object of the invention is to provide a wheel supporting device capable of preventing the ingress of foreign matters such as muddy water and dust into the interior from a gap between meshing portions of the opposite side face splines on the end face of the hub spindle of the hub wheel and on the end face of the constant velocity joint.

In the invention, the hub wheel and the constant velocity joint can be aligned on an identical center line and the opposite side face splines can be easily meshed by the operation of fitting insertion of the shank of the coupling bolt into the inner hole of the hub spindle of the hub wheel.

Further, in the invention, by disusing the calked portion at the end portion of the hub spindle of the hub wheel, torque is satisfactorily transmitted between the hub spindle and the outer ring of the constant velocity joint and large advantages in weight saving and cost reduction are offered.

To attain the above object, in accordance with one aspect of the invention there is provided a wheel supporting device in which a rolling bearing is provided on an outer peripheral surface of a hub spindle of a hub wheel on which a wheel is mounted, and the hub spindle and an outer ring of a constant velocity joint are torque-transmittably coupled to each other, comprising:

opposite side face splines which are respectively formed on an end face of the hub spindle and on an end face of the outer ring of the constant velocity joint which is abutted against the end face, and are adapted to mesh with each other to torque-transmittably couple the hub spindle of the hub wheel and the outer ring of the constant velocity joint; and a tubular seal member for covering outer peripheries of the opposite side face splines, the tubular seal member being disposed so as to straddle an inner ring of the rolling bearing and the outer ring of the constant velocity joint, while maintaining a sealing state.

According to the above-described construction, outer peripheries of the opposite side face splines can be covered and sealed by the tubular seal member disposed so as to saddle the inner ring on the outer periphery of the hub spindle and the outer ring of the constant velocity joint while maintaining a sealing state. Thus, it is possible to satisfactorily prevent the ingress of foreign matters into the interior from a gap between meshing portions of the opposite side face splines.

Moreover, during the transmission of torque, the torque of the outer ring of the constant velocity joint is transmitted to the hub spindle through the opposite side face splines, and the inner ring of the rolling bearing and the tubular seal member also rotate integrally with this hub spindle. For this reason, the tubular seal member is prevented from becoming worn due to the rolling friction, thereby making it possible to satisfactorily maintain sealability over extended periods of time.

The wheel supporting device in accordance with a second aspect of the invention is the wheel supporting device according to the above-described first aspect, wherein the seal member integrally has a metal core one end side of which is pressed fitted on an outer peripheral surface of a side wall portion of the outer ring of the constant velocity joint, and another end side of which extends toward an end face of the inner ring of the rolling bearing of the hub wheel, and an elastic seal portion attached to another end portion of the metal core and brought into close contact with the end face of the inner ring.

According to the above-described construction, one end side of the tubular metal core is press fitted on the outer peripheral surface of the side wall portion of the outer ring of the constant velocity joint, and the elastic seal portion at the other end portion of the metal core is brought into close contact with the end face of the inner ring of the rolling bearing of the hub spindle. It is thereby possible to easily dispose the tubular seal member so as to straddle the inner ring on the outer periphery of the hub spindle and the outer ring of the constant velocity joint and while maintaining a sealing state.

The wheel supporting device in accordance with a third aspect of the invention is the wheel supporting device according to the above-described first aspect, wherein the seal member integrally has a metal core one end side of which is pressed fitted on an outer peripheral surface of the inner ring of the rolling bearing of the hub wheel, and another end side of which extends toward the outer ring of the constant velocity joint, and an elastic seal portion attached to another end portion of the metal core and brought into close contact with the outer ring.

According to the above-described construction, one end side of the tubular metal core is press fitted on the outer peripheral surface of the inner ring of the rolling bearing of the hub spindle, and the elastic seal portion at the other end portion of the metal core is brought into close contact with the outer ring of the constant velocity joint. It is thereby possible to easily dispose the tubular seal member so as to straddle the inner ring on the outer periphery of the hub spindle and the outer ring of the constant velocity joint and while maintaining a sealing state.

In accordance with a fourth aspect of the invention there is provided a wheel supporting device in which a hub spindle of a hub wheel on which a wheel is mounted and an outer ring of a constant velocity joint are torque-transmittably coupled to each other, comprising:

opposite side face splines which are respectively formed on an end face of the hub spindle and on an end face of the outer ring of the constant velocity joint which is abutted against the end face, and are adapted to mesh with each other to torque-transmittably couple the hub spindle of the hub wheel and the outer ring of the constant velocity joint, wherein a coupling bolt projecting from an end face of the outer ring of the constant velocity joint is inserted into an inner hole of the hub spindle, and a lock nut is tightened against an externally threaded portion of a leading end portion of a shank of the coupling bolt to thereby couple the hub spindle of the hub wheel and the outer ring of the constant velocity joint, and wherein a small-diameter hole portion, which has a smaller hole diameter than a remaining portion of the inner hole and into which the shank of the coupling bolt is fittingly inserted with a slight gap, is formed on a portion of an inner peripheral surface of the inner hole of the hub spindle.

According to the above-described construction, in the case where the hub wheel and the constant velocity joint are integrally coupled to each other torque-transmittably, the shank of the coupling bolt projecting from an end face of the outer ring of the constant velocity joint is inserted into the inner hole of the hub spindle from one end side thereof (central side in the transverse direction of the vehicle) toward the other end side thereof (outer side in the transverse direction of the vehicle).

Then, while the opposite side face splines on the end face of the hub spindle and on the end face of the outer ring of the constant velocity joint are being meshed with each other, the lock nut is tightened against the externally threaded portion in a state which the externally threaded portion of the leading end portion of the shank of the coupling bolt projects from the other end side of the inner hole of the hub spindle, thereby integrally coupling the hub wheel and the constant velocity joint torque-transmittably.

When the shank of the coupling bolt is inserted into the inner hole of the hub spindle from one end side toward the other end side thereof, the hub wheel and the constant velocity joint can be accurately aligned on an identical center line by the operation of fitting insertion of the shank of the coupling bolt into the small-diameter hole portion of the inner hole of the hub spindle. For this reason, the opposite side face splines on the end face of the hub spindle and on the end face of the outer ring of the constant velocity joint can be easily meshed with each other.

In particular, as the small-diameter hole portion is formed in a portion of the inner hole of the hub spindle, it is possible to suppress and increase in fabrication cost and the deterioration of the insertability of the coupling bolt, and to suppress the generation of vibrations, abnormal noise, and the like.

The wheel supporting device in accordance with a fifth aspect of the invention is the wheel supporting device according to the above-described fourth aspect, wherein a tapered hole-like guide portion, which continues to a bolt insertion side of the small-diameter hole portion and is adapted to guide the insertion of the leading end of the shank of the coupling bolt, is formed on the inner peripheral surface of the inner hole of the hub spindle.

According to the above-described construction, when the shank of the coupling bolt is inserted into the small-diameter hole portion of the inner hole of the hub spindle, the insertion of the leading end of the shank of the coupling bolt can be guided by means of the tapered hole-like guide portion continuing to the bolt insertion side of the small-diameter hole portion, thereby making it possible to satisfactorily attain improvement of the insertability of the coupling bolt.

In accordance with the sixth aspect of the invention, there is provided a wheel supporting device in which a rolling bearing is provided on an outer peripheral surface of a hub spindle of a hub wheel on which a wheel is mounted, and the hub spindle and an outer ring of a constant velocity joint are torque-transmittably coupled to each other, comprising:

opposite side face splines adapted to mesh with each other and respectively formed on an end face of an inner ring of the rolling bearing and on an end face of a side wall portion of the outer ring of the constant velocity joint which is abutted against the end face; and external splines and internal splines adapted to mesh with each other and respectively formed on an outer peripheral surface of the hub spindle and on an inner peripheral surface of the inner ring of the rolling bearing.

According to the above-described construction, torque on the constant velocity joint side is transmitted to the inner ring of the rolling bearing through the meshing of the side face splines of the outer ring of the constant velocity joint with the side face splines of the inner ring of the rolling bearing on the hub wheel side. The torque is further transmitted to the hub wheel through the meshing of the internal splines of this inner ring with the external splines on the outer peripheral surface of the hub spindle.

Thus, as the side face splines and the internal splines are respectively formed on the end face and the inner peripheral surface of the inner ring of the rolling bearing on the hub wheel side, the calked portion at the end portion of the hub spindle of the hub wheel is disused, and torque can be transmitted satisfactorily between the hub spindle and the outer ring of the constant velocity joint.

In addition, it is possible to reduce the axial length of the wheel supporting device by the portion in which the calked portion at the end portion of the hub spindle is disused, thereby making it possible to attain weight saving.

Furthermore, the side face splines and the internal splines can be respectively formed easily by forging or the like on the end face and the inner peripheral surface of the inner ring in the state of a single item for making up the angular contact ball bearing as a rolling bearing on the hub wheel side. Still further, after the respective splines are formed, the inspection of quality assurance can be performed easily in the state of the single item of the inner ring, which is effective in cost reduction as well.

DETAILED DESCRIPTION OF THE PREFERRED EMBODIMENTS

Next, a description will be given of the best mode for carrying out the invention in accordance with the embodiments.

First Embodiment

Figure 1:
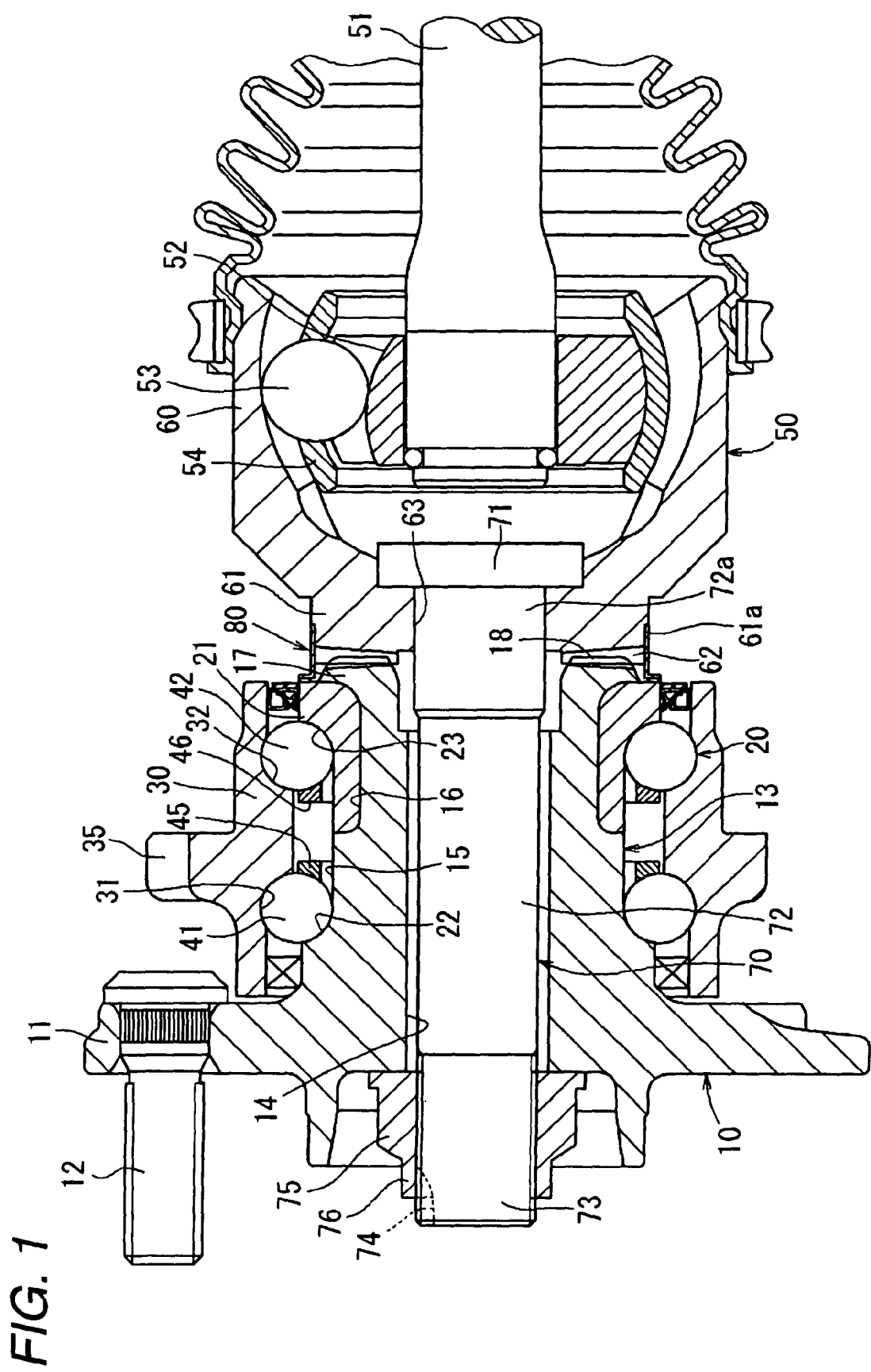
FIG. 1 is a side cross-sectional view illustrating a wheel supporting device in accordance with a first embodiment of the invention.
Figure 2:
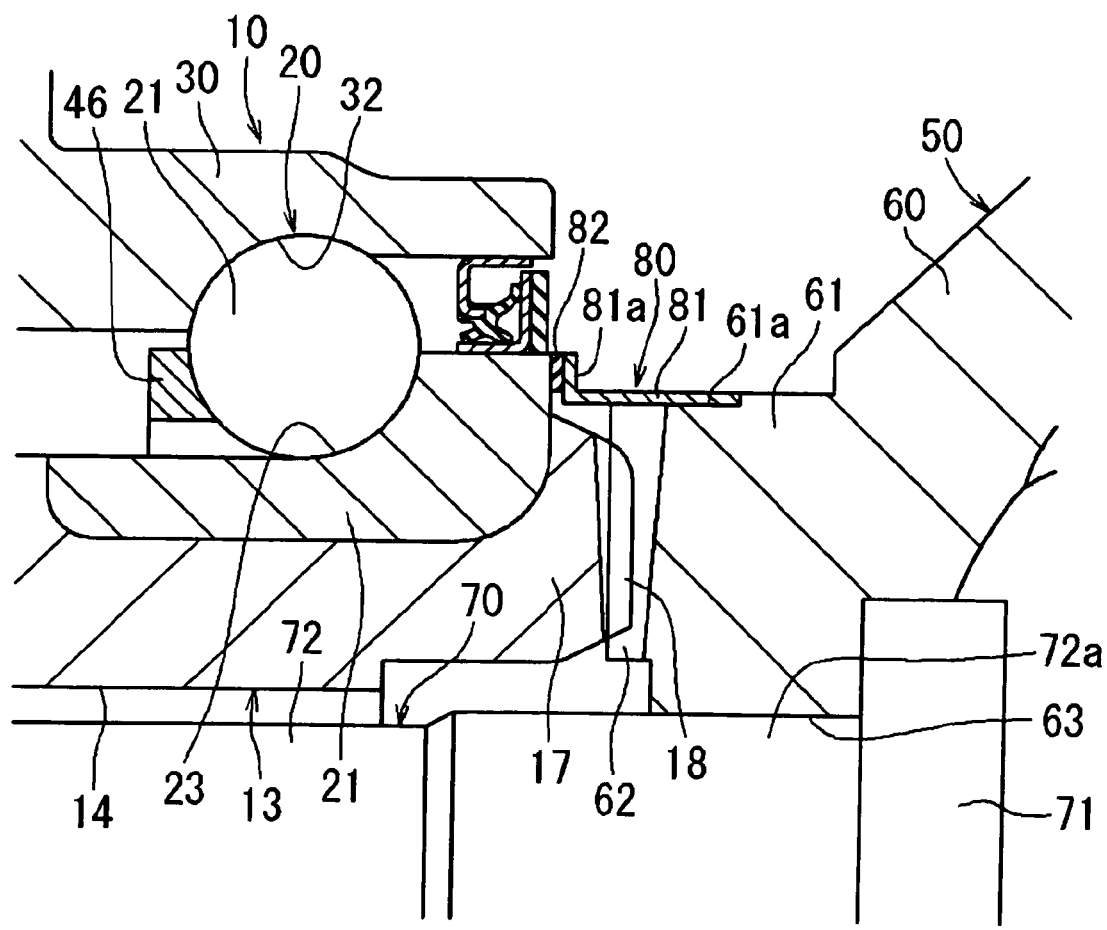
FIG. 2 is a side cross-sectional view illustrating in enlarged form a state in which outer peripheries of opposite side face splines are covered by a tubular seal member disposed so as to straddle an inner ring of a rolling bearing of a hub spindle and an outer ring of a constant velocity joint in accordance with the first embodiment of the invention.

Referring to FIGS. 1 and 2, a description will be given of a first embodiment of the invention.

FIG. 1 is a side cross-sectional view illustrating a wheel supporting device in accordance with the first embodiment of the invention. FIG. 2 is a side cross-sectional view illustrating in enlarged form a state in which outer peripheries of opposite side face splines are covered by a tubular seal member disposed so as to straddle an inner ring of a rolling bearing of a hub spindle and an outer ring of a constant velocity joint.

As shown in FIG. 1, the wheel supporting device of this first embodiment is comprised of a hub wheel 10, a double row angular contact ball bearing 20 serving as a rolling bearing, a constant velocity joint 50, and a tubular seal member 80.

As shown in FIG. 1, the hub wheel 10 integrally has a cylindrical hub spindle 13 and a flange 11 formed on an outer peripheral surface of the hub spindle 13 close to one end portion thereof. Further, a plurality of hub bolts 12 for mounting a wheel (not shown) with a brake rotor (not shown) disposed therebetween are fixed in the flange 11 at predetermined pitches by press fitting.

The double row angular contact ball bearing 20 having an outer ring 30, an inner ring 21, and pluralities of balls 41 and 42 serving as rolling elements, and retainers 45 and 46 is assembled on the outer peripheral surface of the hub spindle 13.

Namely, in this first embodiment, the hub spindle 13 integrally has a large-diameter spindle portion 15 formed on the flange 11 side and a small-diameter spindle portion 16 having a smaller diameter than the large-diameter spindle portion 15 and formed continuously from the large-diameter spindle portion via a stepped portion. Further, a raceway surface 22 corresponding to one raceway surface 31 of the outer ring 30 is formed on an outer peripheral surface of the large-diameter spindle portion 15.

Further, after the inner ring 21, which has formed on its outer peripheral surface a raceway surface 23 corresponding to a mating raceway surface 32 of the outer ring 30, is fitted on an outer peripheral surface of the small-diameter spindle portion 16 of the hub spindle 13, a leading end portion of the small-diameter spindle portion 16 is calked to form a calked portion 17, thereby fixing the inner ring 21 between the stepped portion and the calked portion 17.

Furthermore, the pluralities of balls 41 and 42 and the retainers 45 and 46 for respectively retaining these pluralities of balls 41 and 42 are assembled between the both raceway surfaces 31 and 32 of the outer ring 30 and the both raceway surfaces 22 and 23 on the hub spindle 13 side.

In addition, a fixed flange 35 for mounting by means of bolts on a vehicle body-side member (knuckle or carrier) supported by a suspension device (not shown) of a vehicle is formed on an outer peripheral surface of the outer ring 30.

As shown in the drawings, the constant velocity joint 50, for which a known constant velocity joint called a pzeppa type or bar field type is used, is comprised of an inner ring 52 integrally coupled to one end of a drive shaft 51; an outer ring 60; a plurality of balls 53 disposed between the inner and outer rings 52 and 60; and a retainer 54 for retaining the plurality of balls 53.

In addition, a coupling bolt 70 for integrally coupling the hub wheel 10 and the constant velocity joint 50 projects from a central portion of a side wall portion 61 of the outer ring 60 of the constant velocity joint 50.

In addition, an outer peripheral surface of the side wall portion 61 of the outer ring 60 at a leading end side thereof is subjected to cutting work to a slightly small diameter and is thereby formed into a stepped form, and this small-diameter portion on the leading end side is formed as a press-fitting portion 61a for the seal member 80 which will be described later.

In this first embodiment, the coupling bolt 70 has a head 71 and a shank 72 which are separate units from the outer ring 60 of the constant velocity joint 50, and a through hole 63 is penetratingly provided in a central portion of the side wall portion 61 of the outer ring 60 of the constant velocity joint 50.

Further, the shank 72 of the coupling bolt 70 is fittingly inserted into an inner-side opening of the through hole 63 of the outer ring 60 of the constant velocity joint 50, and a large-diameter portion 72a at a root portion of the shank 72 is press fitted therein up to a position where a lower surface of the head 71 abuts against an inner surface of the side wall portion 61, thereby fixing the shank 72 of the coupling bolt 70 projectingly from the side wall portion 61 of the outer ring 60 of the constant velocity joint 50. An externally threaded portion 73 is formed on a leading end portion of the shank 72 of the coupling bolt 70, and a calking groove 74 for preventing the rotation of a lock nut 75 is recessedly provided in this external threaded portion 73.

As shown in FIGS. 1 and 2, opposite side face splines 18 and 62, which, by meshing with each other, couple the hub spindle 13 and the outer ring 60 of the constant velocity joint 50 torque-transmittably, are respectively formed on an end face of the hub spindle 13 of the hub wheel 10 (in this first embodiment, an end face of the calked portion 17 of the hub spindle 13) and on an end face of the side wall portion 61 of the outer ring 60 of the constant velocity joint 50 which is abutted against this end face.

Further, the hub wheel 10 and the constant velocity joint 50 are integrally coupled to each other torque-transmittably, as described below.

Namely, first, the shank 72 of the coupling bolt 70 projecting from the end face of the side wall portion 61 of the outer ring 60 of the constant velocity joint 50 is inserted into an inner hole 14 of the hub spindle 13 of the hub wheel 10 from one end side thereof (central side in the transverse direction of the vehicle) toward the other end side thereof (outer side in the transverse direction of the vehicle).

Subsequently, while the side face splines 18 on the end face of the hub spindle 13 and the side face splines 62 on the end face of the side wall portion 61 of the outer ring 60 of the constant velocity joint 50 are being meshed with each other, the lock nut 75 is tightened against an externally threaded portion 73 in a state which the externally threaded portion 73 of the leading end portion of the shank 72 of the coupling bolt 70 projects from the other end side of the inner hole 14 of the hub spindle 13. Here, as a portion of a thin-walled portion 76 of the end portion of the lock nut 75 is calked into the calking groove 74 of the externally threaded portion 73 to prevent rotation, the hub wheel 10 and the constant velocity joint 50 are integrally coupled to each other torque-transmittably.

As shown in FIGS. 1 and 2, the tubular seal member 80 for covering the outer peripheries of the opposite side face splines 18 and 62 is disposed so as to straddle the inner ring 21 fixed to the outer peripheral surface of the hub spindle 13 and the outer ring 60 of the constant velocity joint 50, while maintaining a sealing state.

In this first embodiment, the seal member 80 integrally has a metal core 81 and an elastic seal portion 82.

The metal core 81 is formed of a metallic material such as iron or stainless steel into a hollow cylindrical shape, and one end side thereof is pressed fitted and fixed on the press-fitting portion 61a of the side wall portion 61 of the constant velocity joint 50, while the other end side thereof extends toward the end face of the inner ring 21 of the hub spindle 13.

Furthermore, an annular portion 81a is formed on an outer periphery of the metal core 81 at the other end portion thereof so as to extend radially outward.

The elastic seal portion 82 is formed of an elastic body such as a soft resin or rubber into an annular shape of a size substantially similar to that of the annular portion 81a of the metal core 81 and is adhered to one side surface of the annular portion 81a by an adhesive.

Namely, the seal member 80 is arranged such that, before the hub wheel 10 and the constant velocity joint 50 are integrated by the coupling bolt 70, one end portion of the metal core 81 is fixed by being press fitted on the press fitting portion 61a of the side wall portion 61 of the constant velocity joint 50, and the hub wheel 10 and the constant velocity joint 50 are subsequently integrated by the coupling bolt 70, thereby allowing the elastic seal portion 82 to be brought into close contact with the end face of the inner ring 21 of the hub spindle 13.

It should be noted that, in this first embodiment, the annular portion 81a of the metal core 81 is also adapted to function as a press-fitting annular portion against which a press-fitting jig is pressed with the elastic seal portion 82 placed therebetween when the seal member 80 is press fitted on the press fitting portion 61a of the side wall portion 61 of the constant velocity joint 50.

The wheel supporting device in accordance with this first embodiment is constructed as described above.

Accordingly, the torque of the drive shaft 51 during such as the traveling of the vehicle is sequentially transmitted to the inner ring 52 of the constant velocity joint 50, the plurality of balls 53, and the outer ring 60, so that the outer ring 60 is rotated in the same direction as the drive shaft 51.

The torque transmitted to the constant velocity joint 50 is transmitted to the hub wheel 10 through the meshing of the opposite side face splines 18 and 62 on the end face of the hub spindle 13 of the hub wheel 10 (end face of the calked portion 17) and on the end face of the side wall portion 61 of the outer ring 60 of the constant velocity joint 50, thereby rotatively driving the wheel.

As described above, since the torque on the constant velocity joint 50 side can be satisfactorily transmitted to the hub wheel 10 side by the meshing of the side face splines 18 and 62, it is possible to satisfactorily suppress relative slippage between the end face of the hub spindle 13 of the hub wheel 10 and the end face of the outer ring 60 of the constant velocity joint 50. Consequently, it is possible to prevent the generation of abnormal noise caused by the relative slippage between the end face of the hub spindle 13 of the hub wheel 10 and the end face of the outer ring 60 of the constant velocity joint 50.

The seal member 80 is disposed between the inner ring 21 on the outer periphery of the hub spindle 13 and the outer ring 60 of the constant velocity joint 50, and the opposite side face splines 18 and 62 are covered and sealed by this seal member 80. For this reason, it is possible to satisfactorily prevent the unexpected ingress of foreign matters such as dust and muddy water into the interior from a gap between meshing portions of the opposite side face splines 18 and 62.

In addition, during the traveling of the vehicle, since the inner ring 21 of the hub spindle 13 and the seal member 80 rotate in the same direction as the rotating direction of the outer ring 60 of the constant velocity joint 50, the elastic seal portion 82 of the seal member 80 is prevented from becoming worn due to the rolling friction, thereby making it possible to satisfactorily maintain sealability over extended periods of time.

Second Embodiment

Next, a description will be given of a second embodiment of the invention with reference to FIG. 3.

Figure 3:
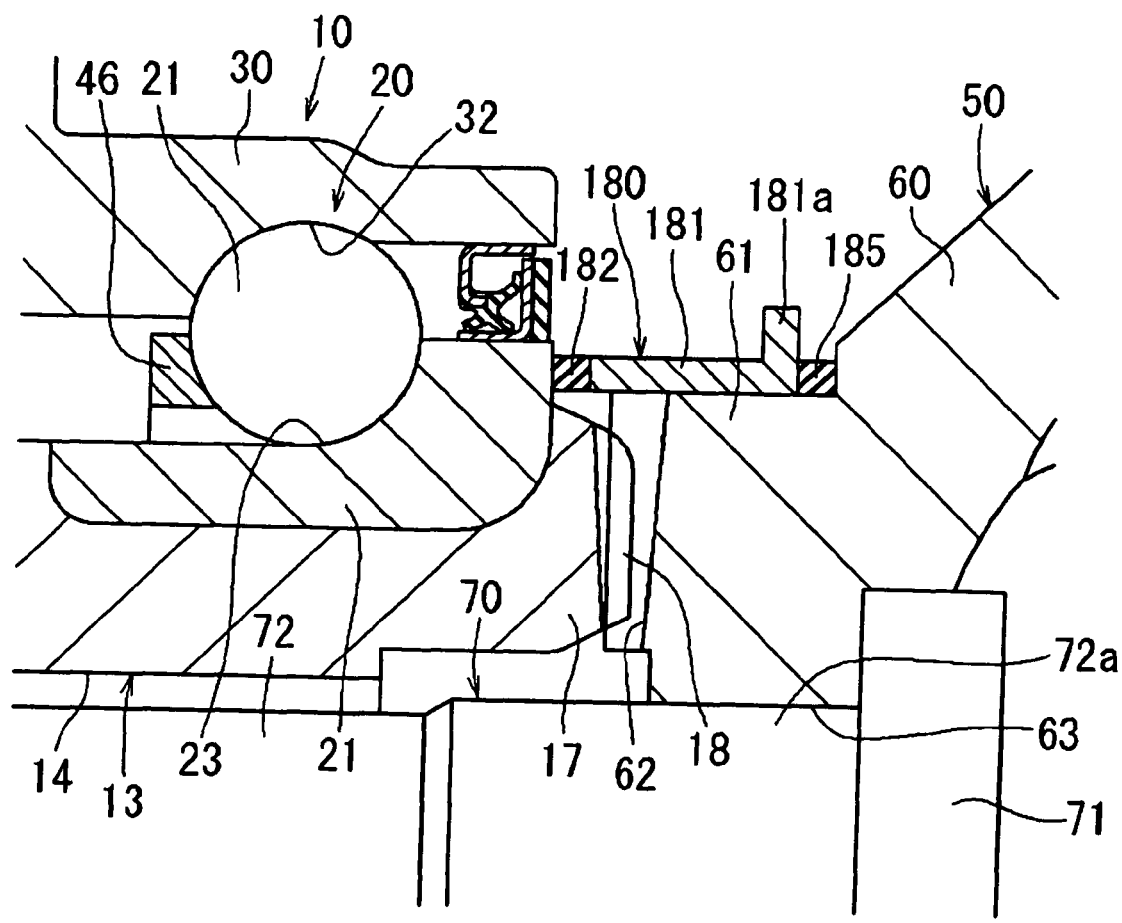
FIG. 3 is a side cross-sectional view illustrating in enlarged form a state in which a tubular seal member is disposed so as to straddle the inner ring of the rolling bearing of the wheel supporting device and the outer ring of the constant velocity joint in accordance with a second embodiment of the invention.

FIG. 3 is a side cross-sectional view illustrating in enlarged form a state in which a tubular seal member is disposed so as to straddle the inner ring of the rolling bearing of the wheel supporting device and the outer ring of the constant velocity joint in accordance with a second embodiment of the invention.

As shown in FIG. 3, a metal core 181, which constitutes a principal portion of a tubular seal member 180 which is disposed so as to straddle the inner ring 21 of the hub spindle 13 and the outer ring 60 of the constant velocity joint 50, is formed into a hollow cylindrical shape from a metallic material such as iron or stainless steel having a greater thickness than the metal core 81 of the first embodiment, and one end side thereof is pressed fitted and fixed to the outer peripheral surface of the side wall portion 61 of the constant velocity joint 50, while the other end side thereof extends toward the end face of the inner ring 21 of the hub spindle 13.

An annular elastic seal portion 182 formed of an elastic body such as a soft resin or rubber is adhered to an annular end face of an extended end of this metal core 181 by an adhesive.

In addition, a press-fitting annular portion 181a is formed on an outer peripheral surface of a proximal end portion of the metal core 181 so as to extend radially outward. An annular seal body 185 formed of an elastic body such as a soft resin or rubber is disposed between this press-fitting annular portion 181a and the stepped surface at the root portion of the side wall portion 61 of the outer ring 60 of the constant velocity joint 50.

Further, before the hub wheel 10 and the constant velocity joint 50 are integrated by the coupling bolt 70, the annular seal body 185 is fitted until it abuts against the stepped surface at the root portion of the side wall portion 61 of the outer ring 60 of the constant velocity joint 50.

Subsequently, after one end portion of the metal core 181 of the seal member 160 is fixed by being press fitted on the outer peripheral surface of the side wall portion 61 of the constant velocity joint 50, the hub wheel 10 and the constant velocity joint 50 are integrated by the coupling bolt 70, thereby allowing the elastic seal portion 182 to be brought into close contact with the end face of the inner ring 21 of the hub spindle 13.

The other arrangements of this second embodiment are similar to those of the first embodiment, so that identical component portions will be denoted by the same reference numerals, and a description thereof will be omitted.

Accordingly, in this second embodiment as well, operational effects substantially similar to those of the first embodiment are offered.

Third Embodiment

Next, a description will be given of a third embodiment of the invention with reference to FIG. 4.

Figure 4:
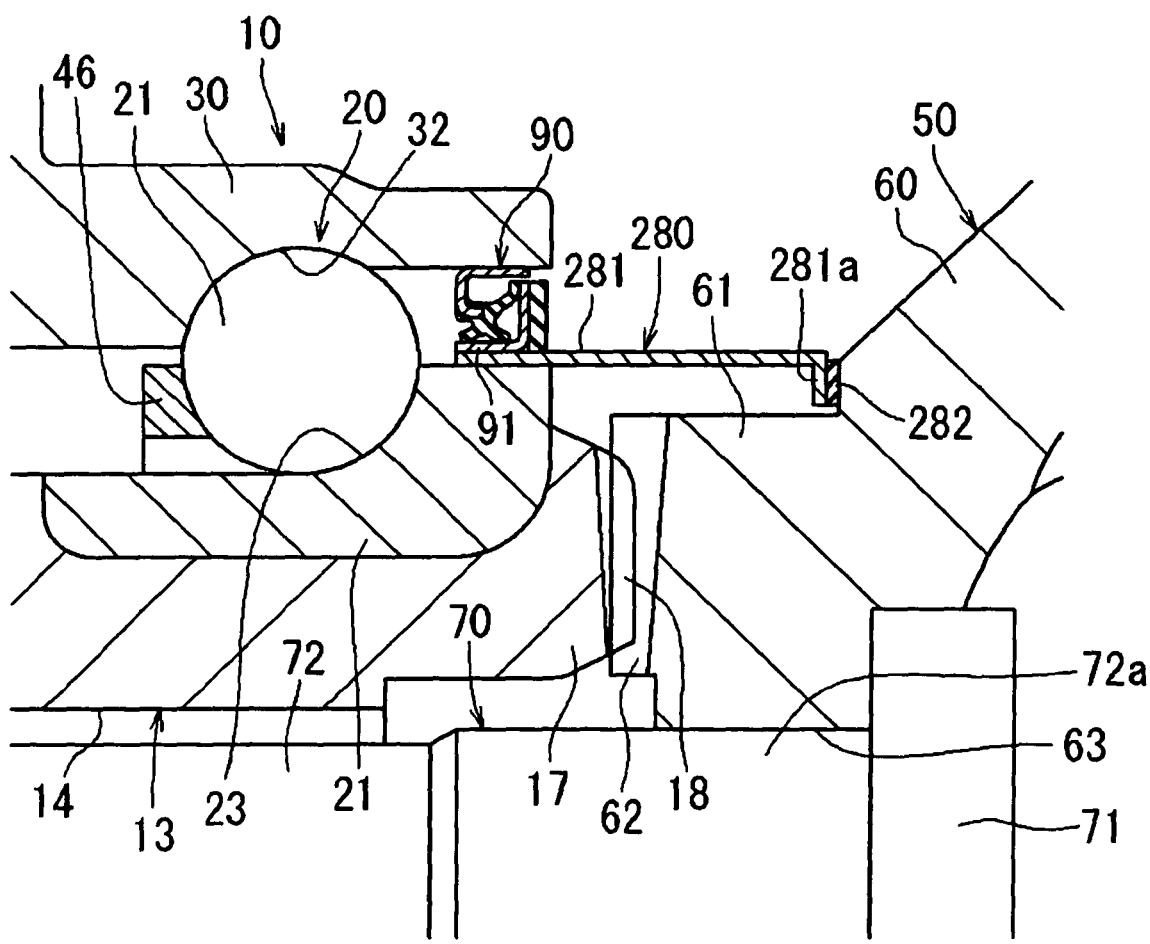
FIG. 4 is a side cross-sectional view illustrating in enlarged form a state in which a tubular seal member is disposed so as to straddle the inner ring of the rolling bearing of the wheel supporting device and the outer ring of the constant velocity joint in accordance with a third embodiment of the invention.

FIG. 4 is a side cross-sectional view illustrating in enlarged form a state in which a tubular seal member is disposed so as to straddle the inner ring of the rolling bearing of the wheel supporting device and the outer ring of the constant velocity joint in accordance with a third embodiment of the invention.

As shown in FIG. 4, a metal core 281, which constitutes a principal portion of a tubular seal member 280 which is disposed so as to straddle the inner ring 21 of the hub spindle 13 and the outer ring 60 of the constant velocity joint 50, is formed into a hollow cylindrical shape from a metallic material such as iron or stainless steel, and one end side thereof is pressed fitted and fixed to the outer peripheral surface of the inner ring 21 of the hub spindle 13, while the other end side thereof extends toward the outer ring 60 of the constant velocity joint 50.

An annular portion 281a is formed on the outer peripheral surface of the other end portion of the metal core 281 so as to extend radially inward. An elastic seal portion 282, which is formed in an annular shape of a size substantially similar to that annular portion 281a, is adhered to one side surface of the annular portion 281a by an adhesive.

Namely, the seal member 280 is arranged such that, before the hub wheel 10 and the constant velocity joint 50 are integrated by the coupling bolt 70, one end portion of the metal core 281 is fixed by being press fitted on the outer peripheral surface of the inner ring 21 of the hub spindle 13, and the hub wheel 10 and the constant velocity joint 50 are subsequently integrated by the coupling bolt 70, thereby allowing the elastic seal portion 282 to be brought into close contact with the stepped surface at the root portion of the side wall portion 61 of the outer ring 60 of the constant velocity joint 50.

It should be noted that, in this third embodiment, the annular portion 282 of the metal core 281 is also adapted to function as a press-fitting annular portion against which a press-fitting jig is pressed with the elastic seal portion 282 placed therebetween when the seal member 280 is press fitted on the outer peripheral surface of the inner ring 21 of the hub spindle 13.

In addition, in this third embodiment, a slinger 91 of a seal device 90 which is called a back seal for sealing an annular space between the inner ring 21 and the outer ring 30 of the hub spindle 13 and the metal core 281 of the seal member 280 may be formed in an integral continuous form, or may be formed individually separately and may then be coupled together integrally by welding, bonding, or the like.

In addition, the slinger 91 may be press fitted on the outer peripheral surface of the metal core 281 after the metal core 281 is press fitted on the outer peripheral surface of the inner ring 21 of the hub spindle 13.

The other arrangements of this third embodiment are similar to those of the first embodiment, so that identical component portions will be denoted by the same reference numerals, and a description thereof will be omitted.

Accordingly, in this third embodiment as well, operational effects substantially similar to those of the first embodiment are offered.

It should be noted that the invention is not limited to the above-described first to third embodiments.

For example, although in the above-described first to third embodiments the case is illustrated in which the coupling bolt 70, which is a separate unit from the outer ring 60, is fixed by press fitting in the through hole 63 in the side wall portion 61 of the outer ring 60 of the constant velocity joint 50, the invention can also be implemented in the case where the coupling bolt is integrally projected from the side wall portion 61 of the outer ring 60.

In addition, as the rolling bearing on the hub wheel 10 side, the invention can be implemented by using a double row tapered roller bearing, apart from the double row angular contact ball bearing 20.

Fourth Embodiment

Figure 5:
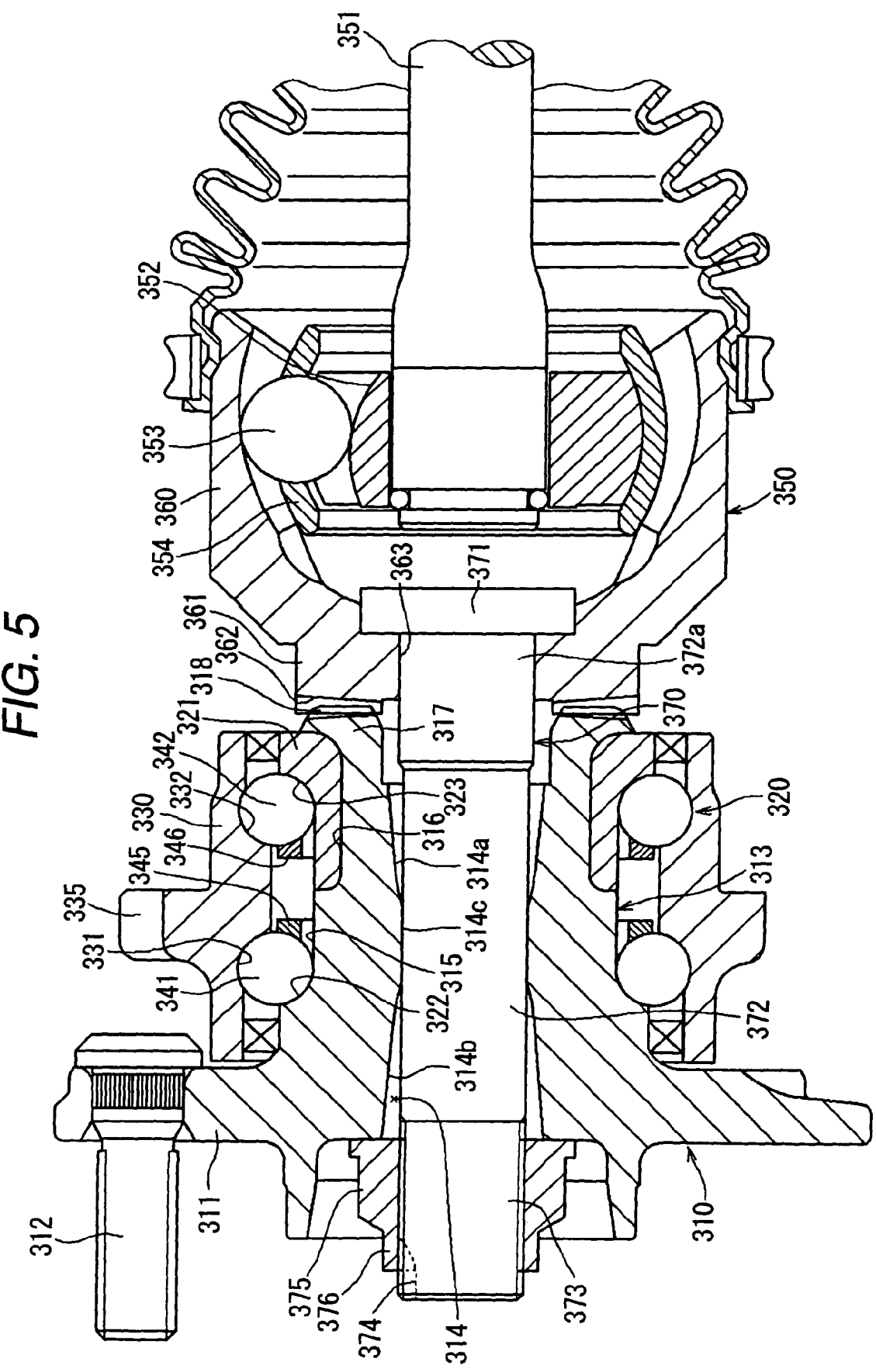
FIG. 5 is a side cross-sectional view illustrating a wheel supporting device in accordance with a fourth embodiment of the invention.
Figure 7:
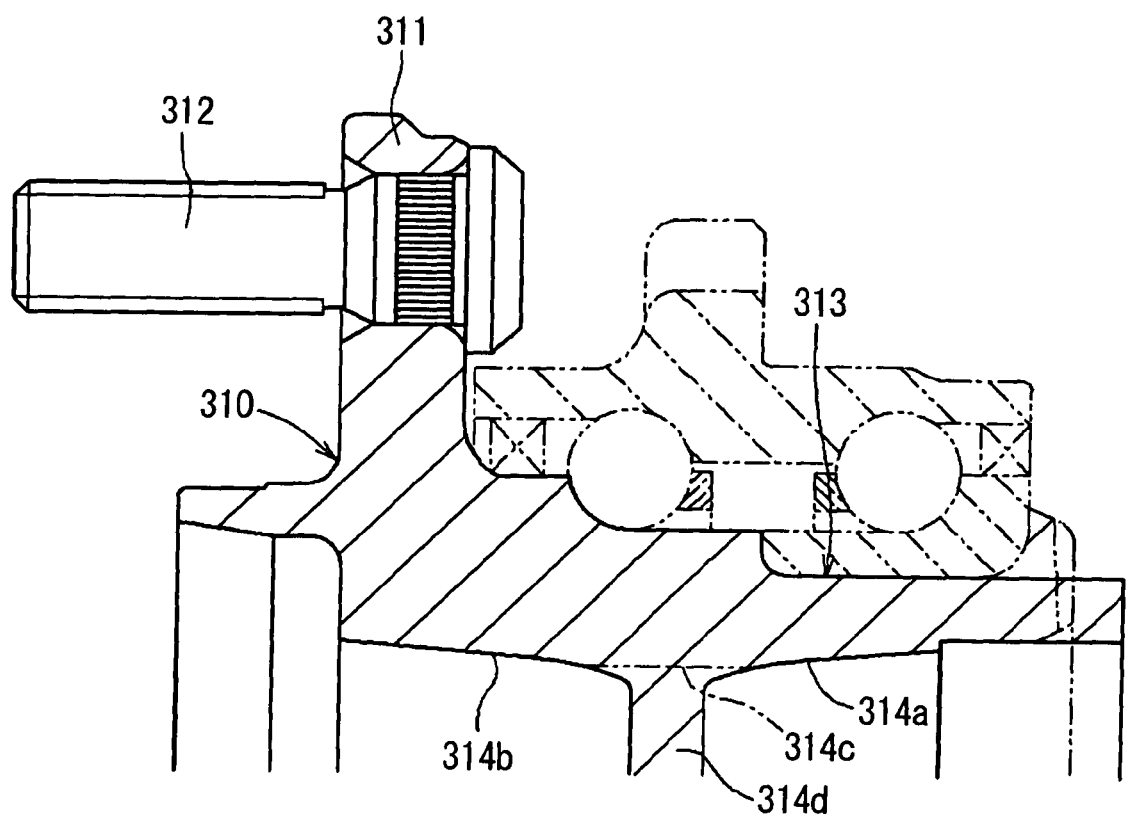
FIG. 7 is a cross-sectional view illustrating a state in which first and second tapered hole portions for forming an inner hole in a central portion of the hub spindle of the hub wheel are formed by forging in accordance with the fourth embodiment of the invention.

Referring to FIGS. 5 and 7, a description will be given of a fourth embodiment of the invention.

Figure 6:
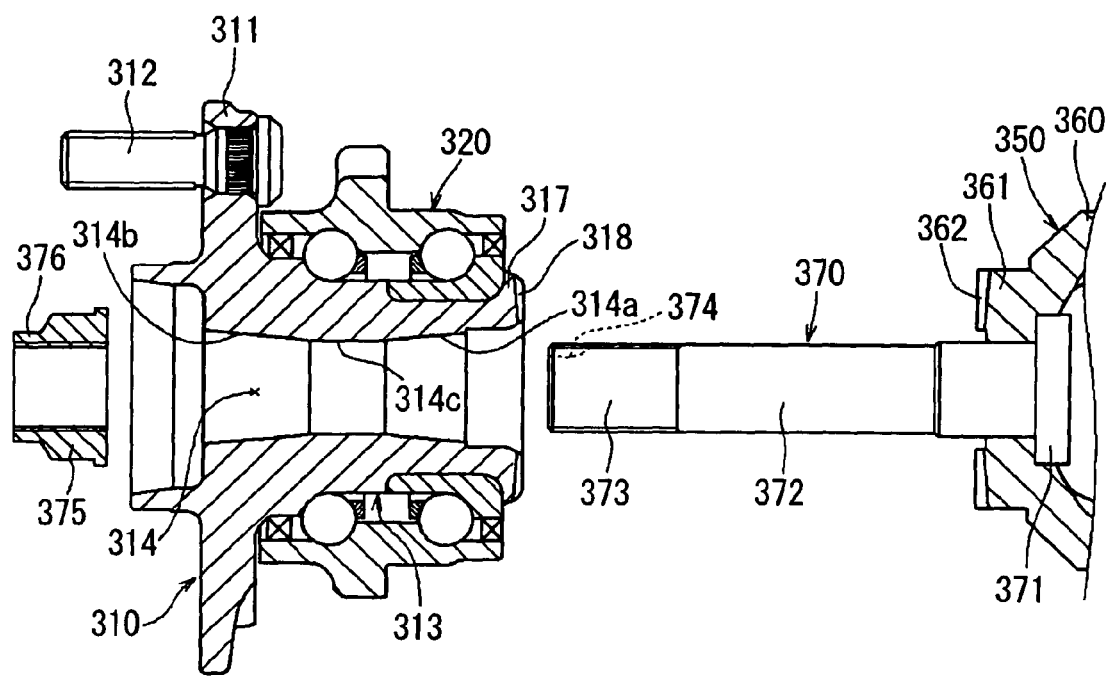
FIG. 6 is a cross-sectional view illustrating a separated state prior to the coupling of a hub wheel and a constant velocity joint in accordance with the fourth embodiment of the invention.

FIG. 5 is a side cross-sectional view illustrating a wheel supporting device in accordance with the fourth embodiment of the invention. FIG. 6 is a cross-sectional view illustrating a separated state prior to the coupling of the hub wheel and the constant velocity joint. FIG. 7 is a cross-sectional view illustrating a state in which first and second tapered hole portions for forming an inner hole in a central portion of the hub spindle of the hub wheel are formed by forging.

As shown in FIG. 5, the wheel supporting device of this fourth embodiment is comprised of a hub wheel 310, a double row angular contact ball bearing 320 serving as a rolling bearing, and a constant velocity joint 350.

The constant velocity joint 350, for which a known constant velocity joint called a pzeppa type or bar field type is used, is comprised of an inner ring 352 integrally coupled to one end of a drive shaft 351; an outer ring 360; a plurality of balls 353 disposed between the inner and outer rings 352 and 360; and a retainer 354 for retaining the plurality of balls 353.

Side face splines 362 are formed on an end face of a side wall portion 361 of the outer ring 360 of the constant velocity joint 350.

In addition, a coupling bolt 370 for integrally coupling the hub wheel 310 and the constant velocity joint 350 projects from a central portion of the side wall portion 361 of the outer ring 360 of the constant velocity joint 350.

In this fourth embodiment, the coupling bolt 370 has a head 371 and a shank 372 which are separate units from the outer ring 360 of the constant velocity joint 350, and a through hole 363 is penetratingly provided in a central portion of the side wall portion 361 of the outer ring 360 of the constant velocity joint 350.

Further, the shank 372 of the coupling bolt 370 is fittingly inserted into an inner-side opening of the through hole 363 of the outer ring 360 of the constant velocity joint 350, and a large-diameter portion 372a at a root portion of the shank 372 is press fitted therein up to a position where a lower surface of the head 371 abuts against an inner surface of the side wall portion 361, thereby fixing the shank 372 of the coupling bolt 370 projectingly from the side wall portion 361 of the outer ring 360 of the constant velocity joint 350. An externally threaded portion 373 is formed on a leading end portion of the shank 372 of the coupling bolt 370, and a calking groove 374 for preventing the rotation of a lock nut 375 is recessedly provided in this external threaded portion 373.

As shown in FIG. 5, the hub wheel 310 integrally has a cylindrical hub spindle 313 and a flange 311 formed on an outer peripheral surface of the hub spindle 313 close to one end portion thereof. Further, a plurality of hub bolts 312 for mounting a wheel (not shown) with a brake rotor (not shown) disposed therebetween are fixed in the flange 311 at predetermined pitches by press fitting.

The double row angular contact ball bearing 320 having an outer ring 330, an inner ring 321, and pluralities of balls 341 and 342 serving as rolling elements, and retainers 345 and 346 is assembled on the outer peripheral surface of the hub spindle 313. Namely, in this fourth embodiment, the hub spindle 313 integrally has a large-diameter spindle portion 315 formed on the flange 311 side and a small-diameter spindle portion 316 having a smaller diameter than the large-diameter spindle portion 315 and formed continuously from the large-diameter spindle portion via a stepped portion. Further, a raceway surface 322 corresponding to one raceway surface 331 of the outer ring 330 is formed on an outer peripheral surface of the large-diameter spindle portion 315.

Further, after the inner ring 321, which has formed on its outer peripheral surface a raceway surface 323 corresponding to a mating raceway surface 332 of the outer ring 330, is fitted on an outer peripheral surface of the small-diameter spindle portion 316 of the hub spindle 313, a leading end portion of the small-diameter spindle portion 316 is calked to form a calked portion 317, thereby fixing the inner ring 321 between the stepped portion and the calked portion 317.

Furthermore, the pluralities of balls 341 and 342 and the retainers 345 and 346 for respectively retaining these pluralities of balls 341 and 342 are assembled between the both raceway surfaces 331 and 332 of the outer ring 330 and the both raceway surfaces 322 and 323 on the hub spindle 313 side.

In addition, a fixed flange 335 for mounting by means of bolts on a vehicle body-side member (knuckle or carrier) supported by a suspension device (not shown) of a vehicle is formed on an outer peripheral surface of the outer ring 330.

As shown in FIGS. 5 and 6, opposite side face splines 318, which mesh with the side face splines 362 at the end face of the side wall portion 361 of the outer ring 360 of the constant velocity joint which is abutted against an end face of the hub spindle 313, are formed on the end face of the hub spindle 313, i.e., an end face of the calked portion 317 of the hub spindle 313 in this fourth embodiment.

Further, a small-diameter hole portion 314c, which has a smaller hole diameter than a remaining portion of an inner hole 314 of the hub spindle 313 and into which the shank 372 of the coupling bolt 370 is fittingly inserted with a slight gap, is formed on a portion of an inner peripheral surface of the inner hole 314 of the hub spindle 313.

In this fourth embodiment, as shown in FIG. 7, a first tapered hole portion 314a and a second tapered hole portion 314b are recessedly provided on an identical center line with draft angles of 5 degrees or thereabouts, respectively, by respective molding tools of a forging apparatus from axially opposite ends of a central portion of the hub spindle 313. A wall portion 314d having a predetermined wall thickness is formed between bottom surfaces of these first and second tapered hole portions 314a and 314b.

Further, after the first and second tapered hole portions 314a and 314b are formed by forging, the wall portion 314d is cut by boring, thereby forming the small-diameter hole portion 314c with high accuracy, as shown in FIG. 6.

Namely, the inner hole 314 of the hub spindle 313 is made up by the first and second tapered hole portions 314a and 314b and the small-diameter hole portion 314c.

The wheel supporting device in accordance with this fourth embodiment is constructed as described above.

In the case where the hub wheel 310 and the constant velocity joint 350 are integrally coupled to each other torque-transmittably, as shown in FIG. 6, the shank 372 of the coupling bolt 370 projecting from the end face of the side wall portion 361 of the outer ring 360 of the constant velocity joint 350 is inserted into the inner hole 314 of the hub spindle 313 of the hub wheel 310 from one end side thereof (central side in the transverse direction of the vehicle) toward the other end side thereof (outer side in the transverse direction of the vehicle).

Subsequently, while the side face splines 318 on the end face of the hub spindle 313 and the side face splines 362 on the end face of the side wall portion 361 of the outer ring 360 of the constant-velocity joint 350 are being meshed with each other, the lock nut 375 is tightened against an externally threaded portion 365 in a state which the externally threaded portion 373 of the leading end portion of the shank 372 of the coupling bolt 370 projects from the other end side of the inner hole 314 of the hub spindle 313. Subsequently, as shown in FIG. 5, as a portion of a thin-walled portion 376 of the end portion of the lock nut 375 is calked into the calking groove 374 of the externally threaded portion 373 to prevent rotation, the hub wheel 310 and the constant velocity joint 350 are integrally coupled to each other torque-transmittably.

When the shank 372 of the coupling bolt 370 is inserted into the inner hole 314 of the hub spindle 313 from one end side toward the other end side thereof, the hub wheel 310 and the constant velocity joint 350 can be accurately aligned on the identical center line by the operation of fitting insertion of the shank 372 of the coupling bolt 370 into the small-diameter hole portion 314c of the inner hole 314 of the hub spindle 313. For this reason, the opposite side face splines 318 and 362 on the end face of the hub spindle 313 and on the end face of the side wall portion 361 of the outer ring 360 of the constant velocity joint 350 can be easily meshed with each other.

In particular, as the small-diameter hole portion 314c is formed in a portion of the inner hole 314 of the hub spindle 313, the fabrication cost can be reduced to a low level in comparison with the case where the inner hole 314 of the hub spindle 313 is subjected to boring over its entire length with high accuracy. Furthermore, it is also possible to suppress the deterioration of the insertability of the coupling bolt 370.

In addition, in this fourth embodiment, when the shank 372 of the coupling bolt 370 is inserted into the small-diameter hole portion 314c of the hub spindle 313, the insertion of the leading end of the shank 372 (leading end of the externally threaded portion 373) of the coupling bolt 370 can be guided by using as a guide portion the first tapered hole portion 314a continuing to the bolt insertion side of the small-diameter hole portion 314c, thereby making it possible to satisfactorily attain improvement of the insertability of the coupling bolt 370.

In addition, in the wheel supporting device constructed as described above, the torque of the drive shaft 351 during such as the traveling of the vehicle is sequentially transmitted to the inner ring 352 of the constant velocity joint 350, the plurality of balls 353, and the outer ring 360, so that the outer ring 360 is rotated in the same direction as the drive shaft 351.

The torque transmitted to the constant velocity joint 350 is transmitted to the hub wheel 310 through the meshing of the opposite side face splines 318 and 362 on the end face of the hub spindle 313 of the hub wheel 310 (end face of the calked portion 317) and on the end face of the side wall portion 361 of the outer ring 360 of the constant velocity joint 350, thereby rotatively driving the wheel.

As described above, since the torque on the constant velocity joint 350 side can be satisfactorily transmitted to the hub wheel 310 side by the meshing of the side face splines 318 and 362, it is possible to satisfactorily suppress relative slippage between the end face of the hub spindle 313 of the hub wheel 310 and the end face of the outer ring 360 of the constant velocity joint 350. Consequently, it is possible to prevent the generation of abnormal noise caused by the relative slippage between the end face of the hub spindle 313 of the hub wheel 310 and the end face of the outer ring 360 of the constant velocity joint 350.

Fifth Embodiment

Next, a description will be given of a fifth embodiment of the invention with reference to FIGS. 8 and 9.

Figure 8:
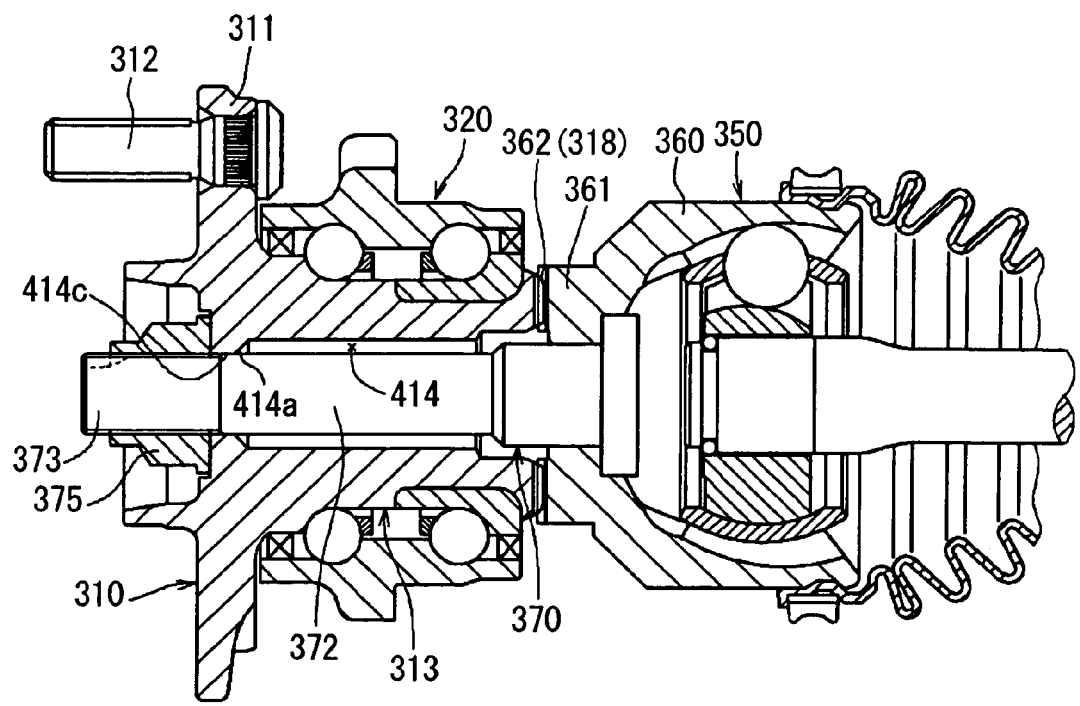
FIG. 8 is a side cross-sectional view illustrating the wheel supporting device in accordance with a fifth embodiment of the invention.

FIG. 8 is a side cross-sectional view illustrating the wheel supporting device in accordance with a fifth embodiment of the invention. FIG. 9 is a cross-sectional view illustrating a separated state prior to the coupling of the hub wheel and the constant velocity joint.

Figure 9:
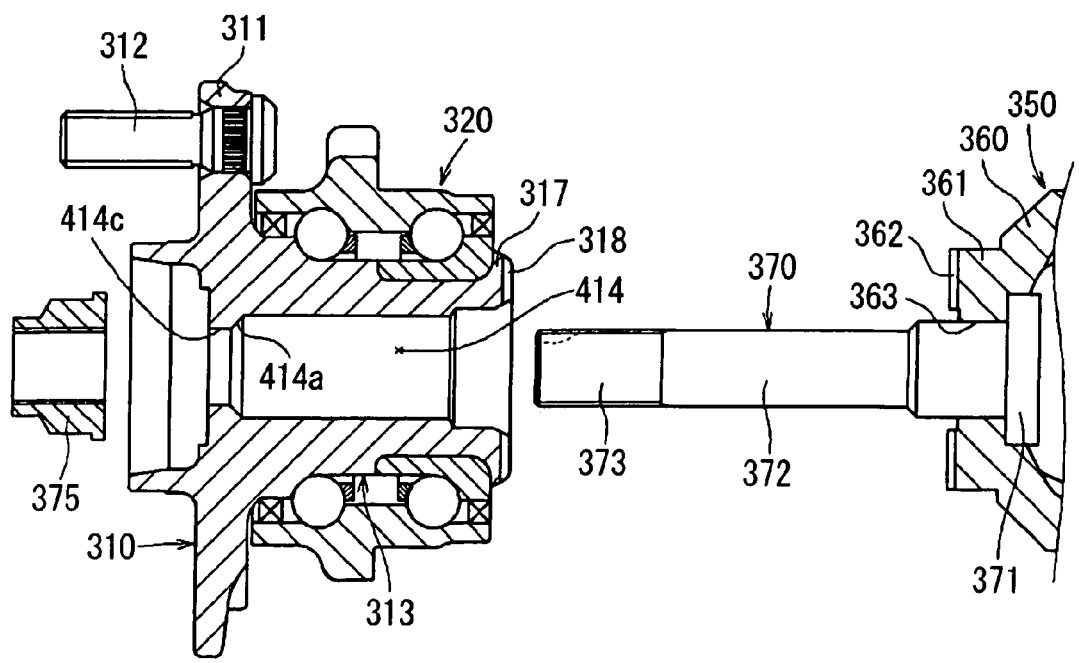
FIG. 9 is a cross-sectional view illustrating a separated state prior to the coupling of the hub wheel and the constant velocity joint in accordance with the fifth embodiment of the invention.

As shown in FIGS. 8 and 9, in this fifth embodiment, a small-diameter hole portion 414c is formed on an inner peripheral surface of an inner hole 414 of the hub spindle 313 of the hub wheel 310 at a position close to an end portion of the inner hole 414 (outer end portion in the transverse direction of the vehicle).

In addition, a tapered hole-like guide portion 414a, which continues to the bolt insertion side of the small-diameter hole portion 414c and is adapted to guide the insertion of the leading end (leading end of the externally threaded portion 373) of the shank 372 of the coupling bolt 370, is formed on the inner peripheral surface of the inner hole 414 of the hub spindle 313.

The other arrangements of this fifth embodiment are similar to those of the fourth embodiment, so that identical component portions will be denoted by the same reference numerals, and a description thereof will be omitted.

Accordingly, in this fifth embodiment as well, operational effects substantially similar to those of the fourth embodiment are offered.

It should be noted that the invention is not limited to the above-described fourth and fifth embodiments.

For example, although in the above-described first and second embodiments the case is illustrated in which the coupling bolt 370, which is a separate unit from the outer ring 360, is fixed by press fitting in the through hole 363 in the side wall portion 361 of the outer ring 360 of the constant velocity joint 350, the invention can also be implemented in the case where the coupling bolt is integrally projected from the side wall portion 361 of the outer ring 360.

In addition, as the rolling bearing on the hub wheel side, the invention can be implemented by using a double row tapered roller bearing, apart from the double row angular contact ball bearing 320.

Sixth Embodiment

Figure 10:
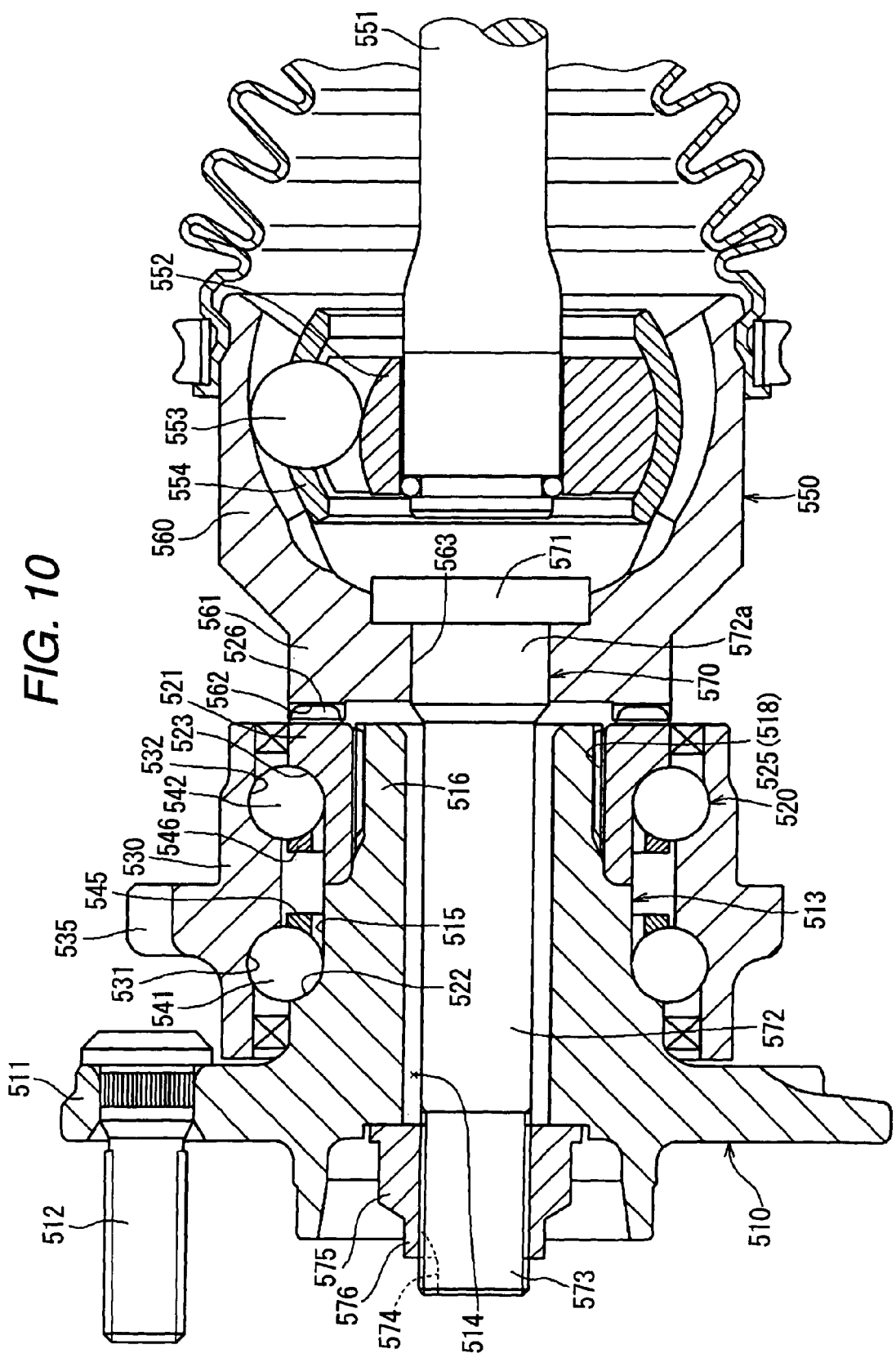
FIG. 10 is a side cross-sectional view illustrating a wheel supporting device in accordance with a sixth embodiment of the invention.
Figure 11:
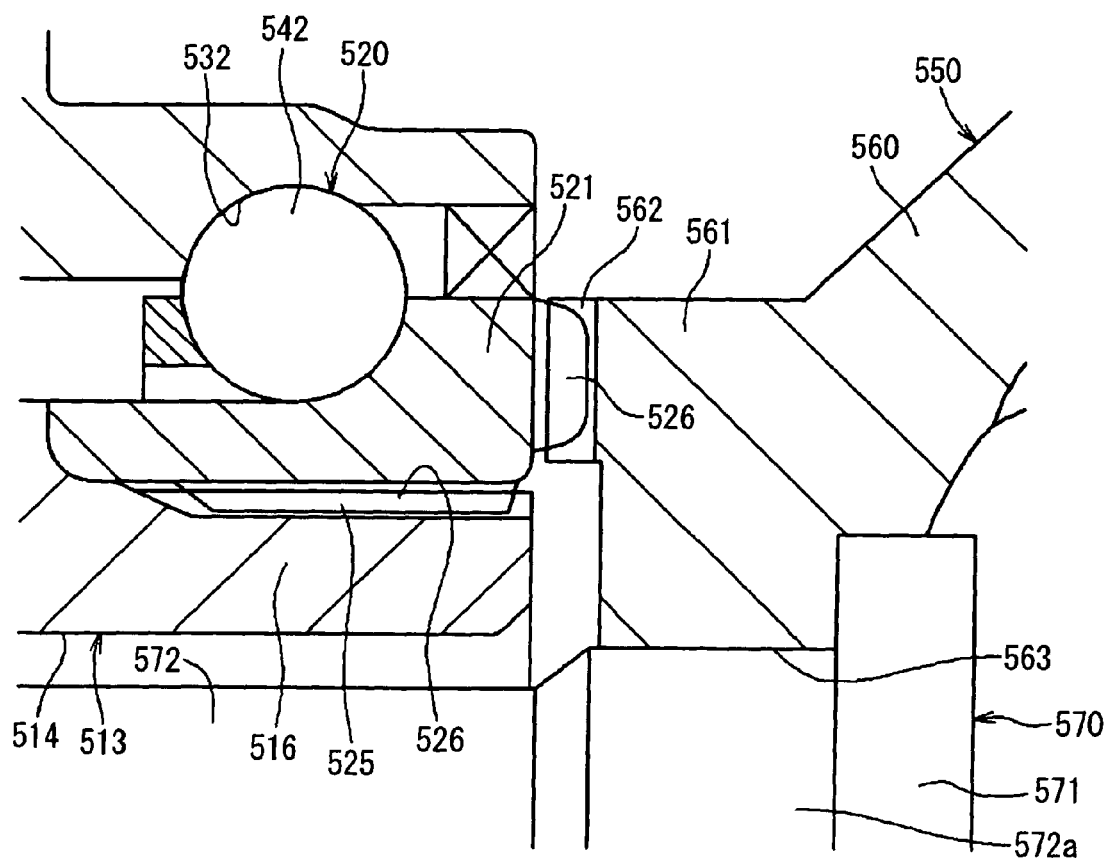
FIG. 11 is a side cross-sectional view illustrating in enlarged form meshing portions of opposite side face splines on an inner ring of a rolling bearing of a hub spindle and on an outer ring of a constant velocity joint.
Figure 12:
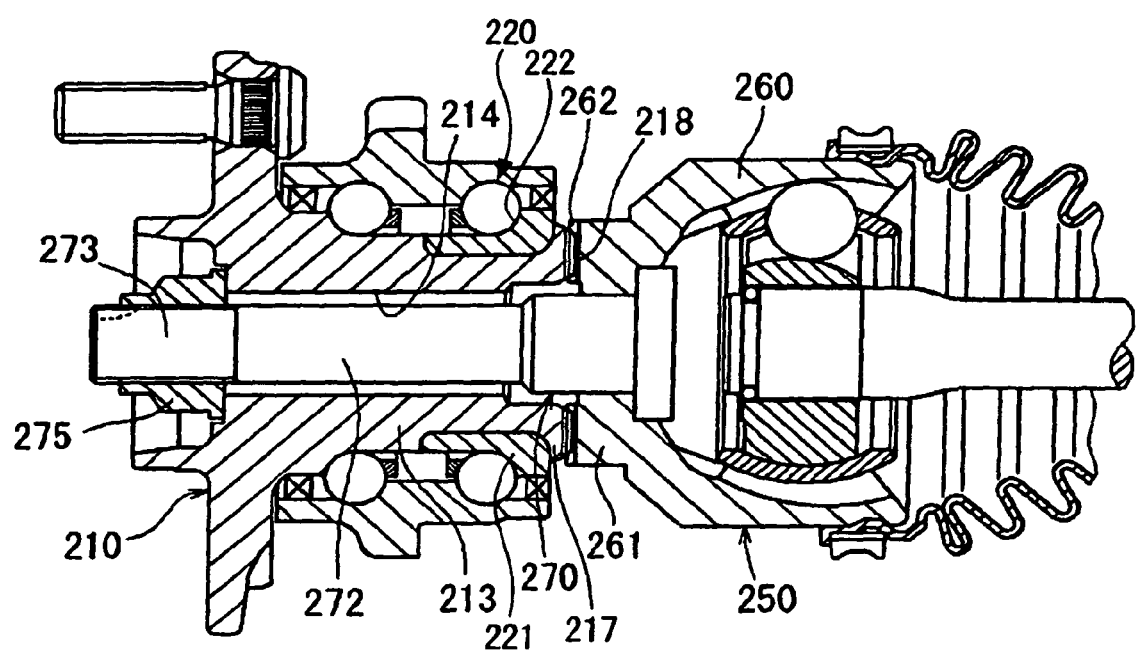
FIG. 12 is a side cross-sectional view illustrating a wheel supporting device in accordance with conventional art.

Referring to FIGS. 10 and 11, a description will be given of a sixth embodiment of the invention.

FIG. 10 is a side cross-sectional view illustrating a wheel supporting device in accordance with the sixth embodiment of the invention. FIG. 11 is a side cross-sectional view illustrating in enlarged form meshing portions of opposite side face splines on an inner ring of a rolling bearing of a hub spindle and on an outer ring of a constant velocity joint.

As shown in FIG. 10, the wheel supporting device of this sixth embodiment is comprised of a hub wheel 510, a double row angular contact ball bearing 520 serving as a rolling bearing, and a constant velocity joint 550.

The constant velocity joint 550, for which a known constant velocity joint called a pzeppa type or bar field type is used, is comprised of an inner ring 552 integrally coupled to one end of a drive shaft 551; an outer ring 560; a plurality of balls 553 disposed between the inner and outer rings 552 and 560; and a retainer 554 for retaining the plurality of balls 553.

Side face splines 562 are formed on an end face of a side wall portion 561 of the outer ring 560 of the constant velocity joint 550.

In addition, a coupling bolt 570 for integrally coupling the hub wheel 510 and the constant velocity joint 550 projects from a central portion of the side wall portion 561 of the outer ring 560 of the constant velocity joint 550.

In this sixth embodiment, the coupling bolt 570 has a head 571 and a shank 572 which are separate units from the outer ring 560 of the constant velocity joint 550, and a through hole 563 is penetratingly provided in a central portion of the side wall portion 561 of the outer ring 560 of the constant velocity joint 550.

Further, the shank 572 of the coupling bolt 570 is fittingly inserted into an inner-side opening of the through hole 563 of the outer ring 560 of the constant velocity joint 550, and a large-diameter portion 572a at a root portion of the shank 572 is press fitted therein up to a position where a lower surface of the head 571 abuts against an inner surface of the side wall portion 561, thereby fixing the shank 572 of the coupling bolt 570 projectingly from the side wall portion 561 of the outer ring 560 of the constant velocity joint 550. An externally threaded portion 573 is formed on a leading end portion of the shank 572 of the coupling bolt 570, and a calking groove 574 for preventing the rotation of a lock nut 575 is recessedly provided in this external threaded portion 573.

As shown in FIG. 10, the hub wheel 510 integrally has a cylindrical hub spindle 513 and a flange 511 formed on an outer peripheral surface of the hub spindle 513 close to one end portion thereof. Further, a plurality of hub bolts 512 for mounting a wheel (not shown) with a brake rotor (not shown) disposed therebetween are fixed in the flange 511 at predetermined pitches by press fitting.

The double row angular contact ball bearing 520 having an outer ring 530, an inner ring 521, and pluralities of balls 541 and 542 serving as rolling elements, and retainers 545 and 546 is assembled on the outer peripheral surface of the hub spindle 513. Namely, in this sixth embodiment, the hub spindle 513 integrally has a large-diameter spindle portion 515 formed on the flange 511 side and a small-diameter spindle portion 516 having a smaller diameter than the large-diameter spindle portion 515 and formed continuously from the large-diameter spindle portion via a stepped portion. Further, a raceway surface 522 corresponding to one raceway surface 531 of the outer ring 530 is formed on an outer peripheral surface of the large-diameter spindle portion 515.

Further, the inner ring 521 formed on an outer peripheral surface of the raceway surface 523 corresponding to the mating raceway surface 532 of the outer ring 530 is fitted to an outer peripheral surface of the small-diameter spindle portion of the hub spindle 513. Furthermore, the pluralities of balls 541 and 542 and the retainers 545 and 546 for respectively retaining these pluralities of balls 541 and 542 are assembled between the both raceway surfaces 531 and 532 of the outer ring 530 of the hub wheel 510 and the both raceway surfaces 522 and 523 on the hub spindle 513 side.

In addition, a fixed flange 535 for mounting by means of bolts on a vehicle body-side member (knuckle or carrier) supported by a suspension device (not shown) of a vehicle is formed on an outer peripheral surface of the outer ring 530.

As shown in FIGS. 10 and 11, external splines 518 and internal splines 525 which mesh with each other are respectively formed on the outer peripheral surface of the small-diameter spindle portion 516 of the hub spindle 513 and on the inner peripheral surface of the inner ring 521.

In addition, side face splines 526 which mesh with the side face splines 562 on the end face of the side wall portion 561 of the outer ring 560 of the constant velocity joint 550 are formed on the end face of the inner ring 521.

The hub wheel 510 and the constant velocity joint 550 are integrally coupled to each other torque-transmittably, as described below.

The external splines 518 on the outer peripheral surface of the small-diameter spindle portion 516 of the hub spindle 513 and the internal splines 525 on the inner peripheral surface of the inner ring 521 are meshed in advance with each other to allow the inner ring 521 to be fitted to the small-diameter spindle portion 516 of the hub spindle 513 torque-transmittably.

Here, first, the shank 572 of the coupling bolt 570 projecting from the end face of the side wall portion 561 of the outer ring 560 of the constant velocity joint 550 is inserted into an inner hole 514 of the hub spindle 513 of the hub wheel 510 from one end side thereof (central side in the transverse direction of the vehicle) toward the other end side thereof (outer side in the transverse direction of the vehicle).

Subsequently, while the side face splines 526 of the inner ring 521 of the hub spindle 513 and the side face splines 562 on the end face of the side wall portion 561 of the outer ring 560 of the constant velocity joint 550 are being meshed with each other, the lock nut 575 is tightened against an externally threaded portion 565 in a state which the externally threaded portion 573 of the leading end portion of the shank 572 of the coupling bolt 570 projects from the other end side of the inner hole 514 of the hub spindle 513. Here, as a portion of a thin-walled portion 576 of the end portion of the lock nut 575 is calked into the calking groove 574 of the externally threaded portion 573 to prevent rotation, the hub wheel 510 and the constant velocity joint 550 are integrally coupled to each other torque-transmittably.

The wheel supporting device in accordance with this sixth embodiment is constructed as described above.

Accordingly, the torque of the drive shaft 551 during such as the traveling of the vehicle is sequentially transmitted to the inner ring 552 of the constant velocity joint 550, the plurality of balls 553, and the outer ring 560, so that the outer ring 560 is rotated in the same direction as the drive shaft 551.

The torque transmitted to the constant velocity joint 550 is transmitted to the inner ring 521 through the meshing of the side face splines 562 of the outer ring 560 of the constant velocity joint 550 with the side face splines 526 of the inner ring 521 on the hub wheel 510 side. The torque is further transmitted to the hub wheel 510 through the meshing of the internal splines 525 of the inner ring 521 with the external splines 518 of the hub spindle 513, thereby rotatively driving the wheel.

Thus, as the side face splines 526 and the internal splines 525 are respectively formed on the end face and the inner peripheral surface of the inner ring 521 on the hub wheel 510 side, the calked portion at the end portion of the hub spindle of the conventional hub wheel is disused, and torque can be transmitted satisfactorily between the hub spindle 513 of the hub wheel 510 and the outer ring 560 of the constant velocity joint 550.

In addition, unlike the conventional example, it is possible to reduce the axial length of the wheel supporting device by the portion in which the calked portion at the end portion of the hub spindle is disused, thereby making it possible to attain weight saving.

Furthermore, the side face splines 526 and the internal splines 525 can be respectively formed easily by forging or the like on the end face and the inner peripheral surface of the inner ring 521 in the state of a single item for forming the angular contact ball bearing 520 as a rolling bearing on the hub wheel 510 side. Still further, after the respective splines 525 and 526 are formed, the inspection of quality assurance can be performed easily in the state of the single item of the inner ring 521, which is effective in cost reduction as well.

It should be noted that the invention is not limited to the above-described sixth embodiment.

For example, although in the above-described sixth embodiment the case is illustrated in which the coupling bolt 570, which is a separate unit from the outer ring 560, is fixed by press fitting in the through hole 563 in the side wall portion 561 of the outer ring 560 of the constant velocity joint 550, the invention can also be implemented in the case where the coupling bolt is integrally projected from the side wall portion 561 of the outer ring 560.

In addition, as the rolling bearing on the hub wheel 510 side, the invention can be implemented by using a double row tapered roller bearing, apart from the double row angular contact ball bearing 520.

What is claimed is:

1. A wheel supporting device in which a rolling bearing is provided on an outer peripheral surface of a hub spindle of a hub wheel on which a wheel is mounted, and the hub spindle and an outer ring of a constant velocity joint are torque-transmittably coupled to each other, the wheel supporting device comprising:
    opposite side face splines which are respectively formed on an end face of the hub spindle and on an end face of the outer ring of the constant velocity joint which is abutted against the end face, and are adapted to mesh with each other to torque-transmittably couple the hub spindle of the hub wheel and the outer ring of the constant velocity joint; and
    a tubular seal member for covering outer peripheries of the opposite side face splines, the tubular seal member being disposed so as to straddle an inner ring of the rolling bearing and the outer ring of the constant velocity joint, while maintaining a sealing state,
    wherein the seal member includes a metal core which straddles, in an axial direction, an axially outermost portion of the outer ring of the constant velocity joint to an axially innermost portion of the inner ring of the rolling bearing, and an elastic seal portion attached to an axially outermost end face or an innermost end face of the metal core, and
    wherein the seal member integrally includes the metal core one end side of which is pressed fitted on an outer peripheral surface of the inner ring of the rolling bearing of the hub wheel, and another end side of which extends toward the outer ring of the constant velocity joint, and the elastic seal portion is attached to another end portion of the metal core and brought into contact with the outer ring.

2. The wheel supporting device according to claim 1, wherein the metal core comprises a cylindrical portion and an annular portion extending radially from an axial end of the cylindrical portion, and
    wherein the elastic seal portion is disposed on an axial end portion of the annular portion opposite the metal core.

3. The wheel supporting device according to claim 2, wherein an other axial end of the cylindrical portion, which is opposite the annular portion, is press fit on the inner ring of the rolling bearing.

4. The wheel supporting device according to claim 2, wherein the annular portion extends radially inward from the cylindrical portion.

5. The wheel supporting device according to claim 2, wherein the elastic seal portion is disposed over an entire surface of the annular portion, in the radial direction.

6. A wheel supporting device in which a roller bearing is provided on an outer peripheral surface of a hub spindle of a hub wheel on which a wheel is mounted, and the hub spindle and an outer ring of a constant velocity joint are torque-transmittably coupled to each other, the wheel supporting device comprising:
    opposite side face splines which are respectively formed on an end face of the hub spindle and on an end face of the outer ring of the constant velocity joint which is abutted against the end face, and are adapted to mesh with each other to torque-transmittably couple the hub spindle of the hub wheel and the outer ring of the constant velocity joint; and
    a tubular seal member for covering outer peripheries of the opposite side face splines, the tubular seal member being disposed so as to straddle an inner ring of the rolling bearing and the outer ring of the constant velocity joint, while maintaining a sealing state,
    wherein the seal member includes a metal core which straddles, in an axial direction, an axially outermost portion of the outer ring of the constant velocity joint to an axially innermost portion of the hub spindle, and an elastic seal portion attached to an axially outermost end face or an innermost end face of the metal core, and
    wherein the metal core is formed in an L-shape.

7. The wheel supporting device according to claim 6, wherein the seal member includes a seal body disposed on the axially outermost end face or the innermost end face of the metal core opposite the elastic seal portion.

* * * * *